May 31, 1955
C. L. DAVIS
2,709,566
ORIFICE UNION FOR PIPE LINES
Filed Aug. 7, 1953
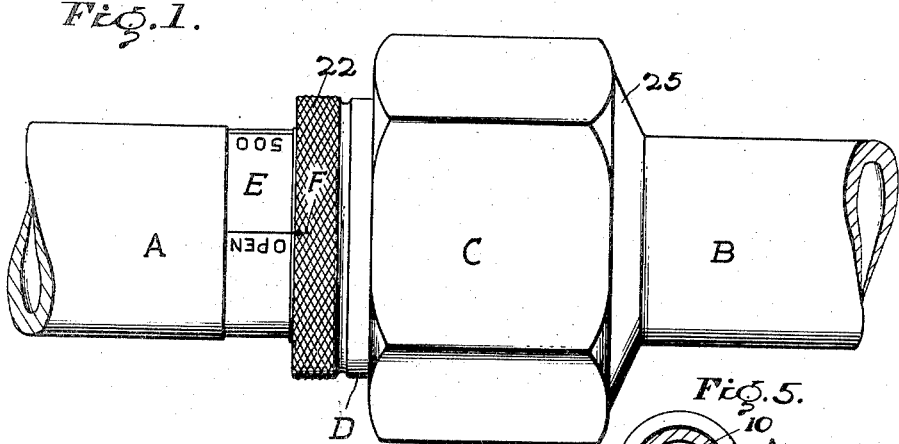
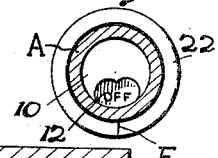
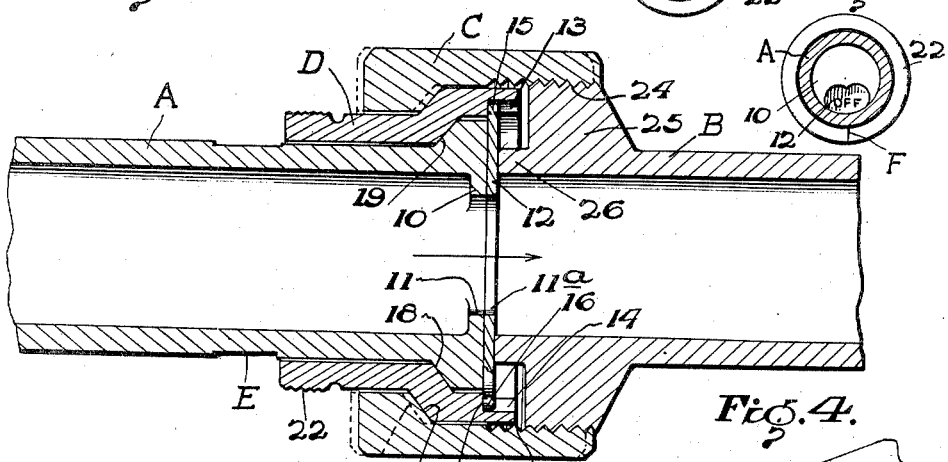
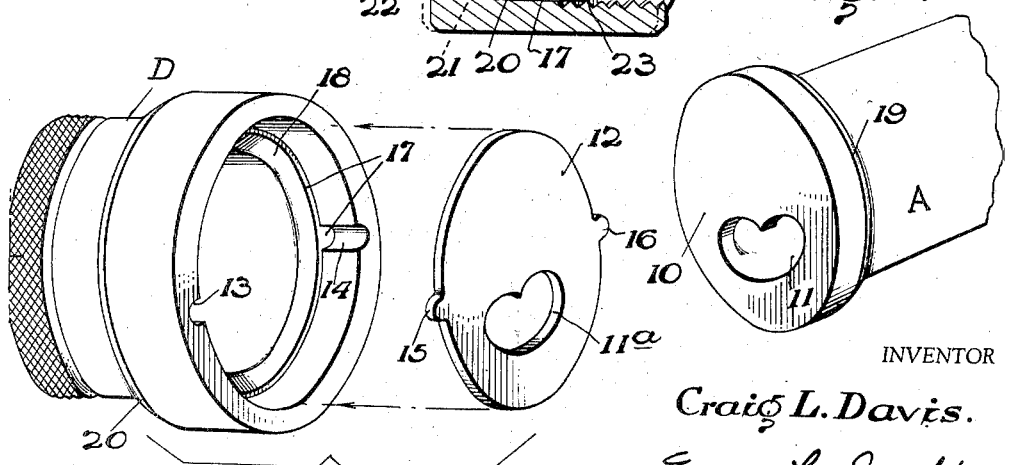
INVENTOR
Craig L. Davis.
BY Emory L. Groff
ATTORNEY United States Patent Office 2,709,566
Patented May 31, 1955

2,709,566

ORIFICE UNION FOR PIPE LINES

Craig L. Davis, Catawissa, Pa., assignor to Catawissa Valve & Fittings Co., Catawissa, Pa., a corporation of Pennsylvania Application August 7, 1953, Serial No. 372,870

5 Claims. (Cl. 251—148)

The present invention relates to variable orifice valves and couplings for interposition in pipe lines used to convey fluids, such as water, gas or oil.

The prior art known to the industry as a choke or flow beam usually is constructed so that the orifice or valve in the pipe coupler cannot be adjusted therein while maintaining the pipe lines coupled together with fluid therein or else it is necessary to provide for interchanging various sizes of orifice plates to regulate fluid flow in the line.

Pressures in various oil wells and fluid flow systems may vary widely during operation and it is very important to provide means, which can be quickly and easily adjusted to regulate the rate and amount of flow in proportion to such widely variable pressures without requiring uncoupling in the pipe line or the use of any extra parts such as interchangeable orifice plates or the like. Accordingly, an object of the present invention is to provide a flow control element adapted to be permanently coupled in a pipe line and readily adjusted for fluid flow control while in such coupled connection.

Another object is to provide a pipe line flow controller, which may be adjusted according to predetermined scale to open or close a flow orifice and then locked to such adjusted position by the simple adjustment of one part of the orifice holding pipe coupling.

Still another object is to provide a variable orifice valve adapted to be completely controlled according to calibrations marked on the exterior of the pipe line from closed to various degrees of a completely open position by a simple turn of the pipe line coupler which houses the valve.

With the above and other objects in view the invention resides in the combination and arrangement of parts as hereinafter set forth, shown in the drawing, described and claimed, it being expressly understood that various changes in the embodiment herein illustrated and described may be made within the scope of the appended claims without departing from the concept of the invention.

In the drawing:

Figure 1 is a side elevational view of the flow controller device interposed in a pipe line.

Figure 2 is a longitudinal cross section view of Figure 1.

Figure 3 is a separated and pulled apart perspective view of the orifice valve parts which are adapted to be turned with respect to the fixed orifice opening in the end of one section of the pipe line.

Figure 4 is a top end view in perspective of the fixed orifice opening in the end of one section of the pipe line.

Figure 5 is a transverse section view looking into the bore of the pipe and showing the orifice valve set to a one-half or .500 scale opening, while Figure 6 is a similar view to Figure 5 with the orifice valve set to full open position according to the scale marking and index line on the pipe line and coupling, respectively.

Referring to the drawing and first with reference to Figures 1, 2 and 4, there is shown interpositioned in a pipe line comprising aligned pipe sections A and B, a coupling member C. This coupling includes a flow controlling variable orifice valve comprised of a fixed disk 10 with a heart-shaped opening 11 therein and an adjacent rotatable or movable disk 12 between the substantially aligned ends of the pipe sections A and B, said second disk 12 having a similar opening 11a therein.

The fixed valve disk 10 may be formed integrally from the end of one pipe section, such as shown in the section A, see Figure 4, or if desired simply brazed or welded over the pipe end. The movable valve disk 12 is mounted in a carrier sleeve D internally formed with longitudinal diametrically opposite grooves 13 and 14, see Figure 3. These grooves serve as keyways for the reception of circumferentially projecting lugs or ears 15 and 16, which are positioned diametrically opposite to each other as parts of the movable valve disk 12.

The interior of the sleeve D is bell-shaped and is counterbored or otherwise formed with an annular shoulder 17 in the mouth of the bell and the peripheral face of the movable disk 12 seats or rests on this shoulder and is therefore carried and turnable with the sleeve D through the lugs 15 and 16. From the mouth of the bell the bore of the sleeve is formed with a slanting annular bearing surface 18, which engages with a similar annular bearing surface 19 formed around the exterior end of the pipe section A, see Figures 2 and 4.

The exterior surface of the sleeve D at the juncture defined by the mouth portion of the bell with the head portion thereof and substantially in parallel relation angularly with respect to the interior bearing surface 18 is formed with an exterior annular slanting coupling or locking surface 20. This coupling surface 20 coacts with a complementary coupling surface 21 formed interiorly of the coupling member C.

The coupling member C controls the locking of the flow control valve disk and turning of the carrier sleeve D to various predetermined amounts of orifice opening from zero to full open position in accordance with a scale E marked around the exterior circumference of the pipe section A positioned in view just beyond the knurled exposed end 22 of the carrier sleeve D and an index line F, marked on the end of the carrier sleeve, see Figure 1. The member C is internally formed with screw threads 23 at one end and projects annularly to engage with a set of screw threads 24 formed exteriorly around an annular enlargement 25 formed adjacent the aligned end of the pipe section B. This pipe section at its extreme end is reduced exteriorly in circumference to form a spacer such as the annular projection or ring-like section 26, which extends beyond the enlargement 25 toward the movable valve disk 12 and serves to prevent displacement of the disk lugs 15 and 16 beyond the extent of the longitudinal grooves or keyways 13 and 14 during release of the coupling member C and subsequent adjustment of the flow orifice opening by turning of the carrier sleeve D. Thus the coupling member C may be threaded from the pipe section B, so as to move longitudinally as it rotates toward the pipe section A, to thereby separate the coupling surface 21 thereof from the exterior coupling surface 20 of the carrier sleeve D, see Figure 2. Such separation of these coupling surfaces leaves the sleeve D free to be turned as desired in accordance with the scale marks in the pipe section A, so as to line up the scale with the index mark F on the knurled end 22 of the valve disk carrier sleeve. For example, in Figure 5, the carrier sleeve D is turned to have its index line F opposite the scale marked .500 or ½ open position, or as in Figure 6, the same is adjusted according to scale to the full open position of the valve.

After adjustment to any desired orifice opening the coupling C is tightened by threading the same back toward the pipe section B, until the coupling surfaces 20 and 21 become forced together and thereby lock the sleeve D and its valve disk 12 to the adjusted position.

From the above it can be understood that complete flow control is accomplished by the turning of only two parts, namely the first part comprising the coupling member C to either release or lock the flow control valve, and the second part comprising the turnable valve carrier sleeve D for adjusting the movable valve disk 12 carried thereby. During the adjustment of flow, the pipe sections A and B remain coupled, and there is substantially no leakage because of the projected reduced end or ring-like section 26 on the end of pipe section B, which serves to maintain a fluid seal as well as to retain the ears 15 and 16 of the valve disk 12 in the longitudinal grooves 13 and 14.

Without further description it is thought that others skilled in this art should be able to clearly understand the same; and it is to be expressly understood that various changes in the arrangement and combination of the parts illustrated, as will now be apparent to others, are intended to be a part hereof. To determine the scope of the invention reference should be had to the appended claims.

I claim:

1. A variable flow control means for interposition in end to end aligned pipe lines comprising a first disk formed with an orifice and a second disk adjacent said first disk and likewise being formed with a similar orifice, said first disk being fixed to the end of one of said pipe lines, said second disk being movable with respect to said first disk, said second disk being keyed in a sleeve rotatably mounted on the said last mentioned pipe line, coupling means having a bore for coupling said aligned pipe lines together in end to end relation with the said disks therebetween, and means in the bore of said coupling means adapted to hold said sleeve against rotation upon tightening of said coupling means.

2. A variable flow control means for interposition in end to end aligned pipe lines comprising a first disk formed with an orifice and a second disk adjacent said first disk and likewise being formed with a similar orifice, said first disk being fixed to the end of one of said pipe lines, said second disk being movable with respect to said first disk, said second disk being keyed in a sleeve rotatably mounted on the said last mentioned pipe line, coupling means having a bore for coupling said aligned pipe lines together in end to end relation with the said disks therebetween, and means in the bore of said coupling means adapted to hold said sleeve against rotation upon tightening of said coupling means, said last mentioned pipe line having scale markings thereon corresponding to various relative positions of the orifices in the respective disks, and said sleeve having marked thereon an index line adapted to align with any of the said scale markings selected.

3. A fluid flow control coupling for aligned conduits comprising first and second pipe sections aligned end to end, means for coupling said first and second sections together comprising a sleeve mounted around the end of said first pipe section, said sleeve being bell-shaped and formed internally and externally with slanting surfaces, said internal surface being engageable with a similar surface around the exterior of said first pipe section, a coupler member having interior threads engageable with complementary external threads on the end of said second pipe section, said coupler having an internal annular slanting surface in its bore opposite to the said threaded end thereof engageable and disengageable with the said external slanting surface around said sleeve by threading the coupler member longitudinally on the threads of said second pipe section, said sleeve being turnable with respect to said pipe sections when the said surfaces are disengaged, a flow orifice formed in a disk over the end of said first pipe section and fixed thereto, a second flow orifice formed in a disk carried by the said turnable sleeve and keyed thereto, each respective orifice being identical in shape and size and adapted to register with each other, and means on an end of said sleeve for turning the same to vary the registration of one orifice with respect to the other to control the flow of fluid therethrough.

4. A flow control for end to end aligned pipe lines comprising a variable orifice valve, said valve comprising a pair of adjacent disks, each of said disks having a similarly shaped orifice, means turnably mounted on the pipe adapted to carry one of said disks, said other disk being fixed in the pipe with respect to said turnably mounted disk, whereby the turning of said means either variably registers each respective orifice with each other or completely positions each orifice out of register with each other, means for turning said first named means on said pipe having an index line marked thereon, a scale marked circumferentially around the said pipe adjacent said index line calibrated in terms of the amount of the registration of each respective orifice with each other, and a coupling member having a bore for coupling said pipe lines together adapted to hold said first named turnably mounted means in a selected scale position when tightened.

5. A variable flow control means for interposition in end to end aligned pipe lines comprising a first disk formed with an orifice and a second disk adjacent said first disk and likewise being formed with a similar orifice, said first disk being fixed to the end of one of said pipe lines, said second disk being movable with respect to said first disk, said second disk being keyed in a sleeve rotatably mounted on the said last mentioned pipe line, coupling means having a bore for coupling said aligned pipe lines together in end to end relation with the said disks therebetween, and means in the bore of said coupling means adapted to hold said sleeve against rotation upon tightening of said coupling means, said other pipe section having an exteriorly threaded enlargement engaged within the bore of said coupling means and also having an annular reduced projection adapted to engage said second disk and retain the same within the said sleeve when said coupling means is tightened by said sleeve.

References Cited in the file of this patent

UNITED STATES PATENTS

| Number | Name | Date |
|---|---|---|
| 292,349 | Payne | Jan. 22, 1884 |
| 762,933 | Norling | June 21, 1904 |
| 1,143,230 | Root | June 15, 1915 |
| 2,210,559 | Albright | Aug. 6, 1940 |
| 2,556,583 | Hinz | June 12, 1951 |